US007159804B2

(12) United States Patent
Macaluso et al.

(10) Patent No.: US 7,159,804 B2
(45) Date of Patent: Jan. 9, 2007

(54) UNIT AND METHOD FOR RECYCLING A BITUMINOUS MEMBRANE

(75) Inventors: Nino Macaluso, Perwez (BE); Eric Bertand, Hingeon (BE)

(73) Assignee: Performance Roof Systems S.A. En Abrege P.R.S., Perwez (BE)

( * ) Notice: Subject to any disclaimer, the term of this patent is extended or adjusted under 35 U.S.C. 154(b) by 0 days.

(21) Appl. No.: 11/020,760

(22) Filed: Dec. 23, 2004

(65) Prior Publication Data
US 2005/0263625 A1 Dec. 1, 2005

(51) Int. Cl.
*B02C 19/00* (2006.01)
(52) U.S. Cl. ............... 241/23; 241/29; 241/65; 241/160; 241/166
(58) Field of Classification Search ............ 241/23, 241/30, 237, 166, 167, 242, 29, 160, 65, 241/66, 67
See application file for complete search history.

(56) References Cited

U.S. PATENT DOCUMENTS

| 1,355,093 A | 10/1920 | Herche |
| 2,156,619 A | 5/1939 | Carruthers |
| 4,185,784 A | 1/1980 | Flita |

FOREIGN PATENT DOCUMENTS

JP    7188673    7/1995

*Primary Examiner*—Mark Rosenbaum
(74) *Attorney, Agent, or Firm*—Spencer Fane Britt & Browne

(57) ABSTRACT

Method and unit for recycling a bituminous membrane provided with at least one reinforcement, which membrane is reduced to pieces which are introduced into a recycling unit, provided with a first rotor, housed in a first stator, and where they are heated and ground, said pieces being conveyed into a chamber, delimited by an external wall of the first rotor and a recess arranged in a counter-element mounted on the stator, where they are subjected to a trituration, the pieces thus triturated then being discharged from the chamber by flowing along said external wall of the rotor.

18 Claims, 10 Drawing Sheets

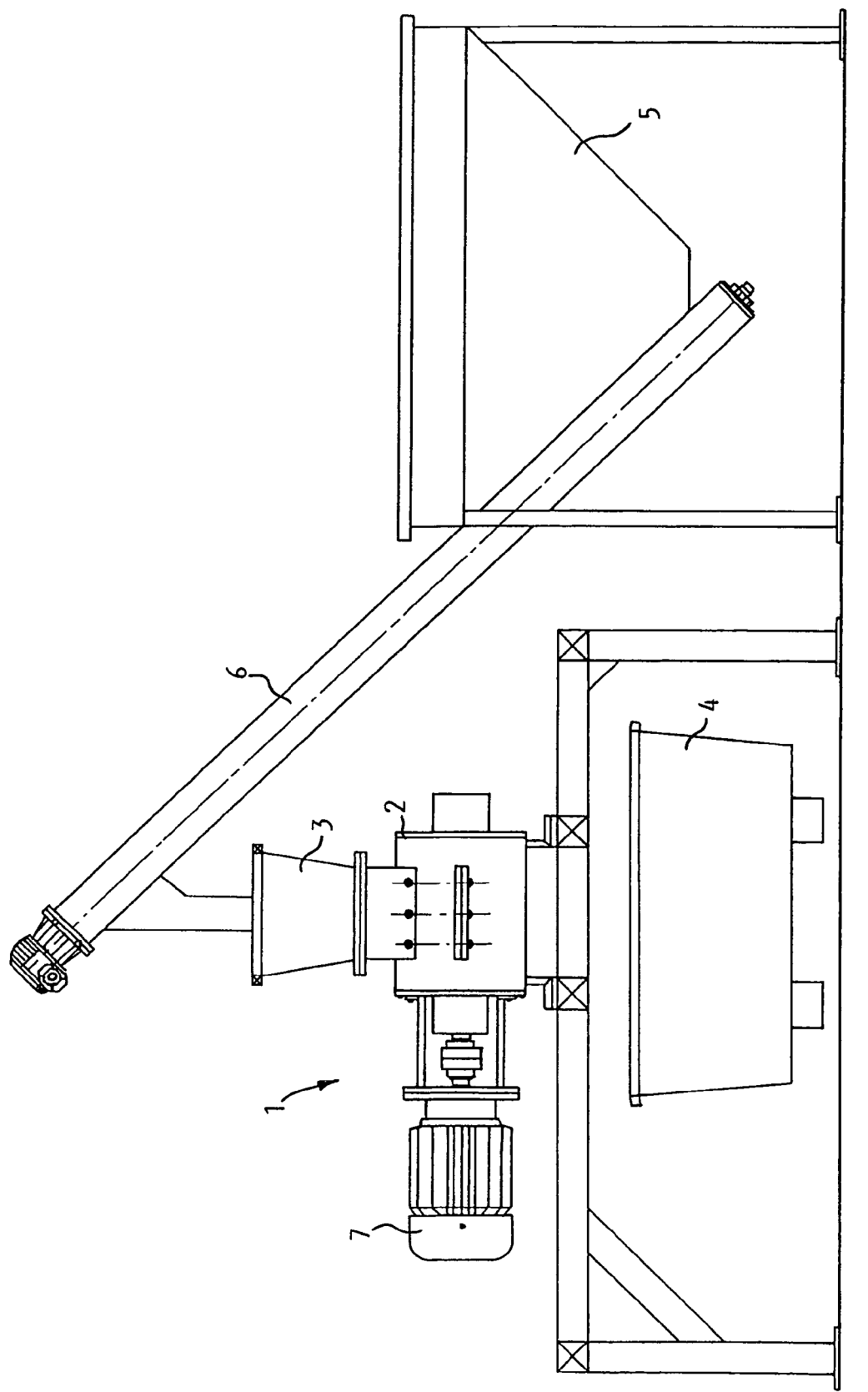

UNIT AND METHOD FOR RECYCLING A BITUMINOUS MEMBRANE

CLAIM TO PRIORITY

This application claims priority from PCT/BE2003/000116, filed Jun. 30, 2003, which claims priority of Belgian Patent Application No. 2002/0418, filed Jun. 28, 2002.

BACKGROUND OF THE INVENTION

The present invention concerns a recycling unit organized for recycling a bituminous membrane provided with at least one reinforcement, which unit comprises a first rotor housed in a first stator, provided with a chamber delimited by an external wall of the first rotor.

A recycling unit is known from the patent U.S. Pat. No. 4,185,784. In the known unit, the material to be recycled in introduced into the recycling unit provided with heating means. The material to be recycled thus melts under the effect of the heat and friction with the rotor of the unit. The rotation of the rotor disintegrates the reinforcements present in the material to be recycled so that the product thus obtained is recyclable. The known unit comprises a chamber that is arranged in the wall of the stator so that the width of this chamber is reduced from the input thus causing a funnel effect that pushes the material towards the rotor.

One drawback of the known recycling method and unit is that they are not entirely appropriate for recycling bituminous membranes provided with at least one reinforcement. This is because this reinforcement, generally consisting of fibers, is often difficult to destroy completely. Masses of fibers thus remain in the product resulting from the recycling method and prevent this product being used, as a raw material, for the manufacture of new membranes. Moreover, the arrangement of the chamber in the stator imposes a non-cylindrical construction of the stator, which imposes a fairly complex technique for manufacturing the stator. Finally, the material is insufficiently triturated to be recycled correctly.

The aim of the invention is to implement a recycling unit that makes it possible to adequately recycle bituminous membranes provided with at least one reinforcement and thus obtain a recycled product that can be used as a raw material, without a complex construction of the stator.

BRIEF SUMMARY

To that end, a recycling unit according to the invention includes a chamber that is a trituration chamber formed by a recess arranged in a counter-element mounted on the stator which is substantially cylindrical, which trituration chamber comprises an adjustment means organized to adjust the volume and/or shape of the chamber and in that at least one scraper organized to scrape the external wall of the rotor is mounted downstream of the trituration chamber, which scraper extends over at least part of the length of the first rotor and has a stepped profile having at least a first and a second step, the first step, which is situated close to an output of the recycling unit, being disposed closest to the external wall of the first rotor. Subjecting the pieces to trituration succeeds in disintegrating the reinforcement present in the membrane pieces. Moreover, the fact of being able to modify the shape and/or volume of the chamber by the positioning of the counter-element allows not only a simpler and less expensive construction of the unit, but also an adaptation of the sizes of the chamber to the types of membrane to be recycled. The bituminous binder contained in the pieces can thus be melted which makes it possible to recover it more easily and obtain a recycled material allowing an increased use, in particular as a raw material. The presence of the scraper makes it possible to clean the wall of the rotor and ensures that the recycled bitumen is guided out of the grinder. The stepped profile of the scraper makes it possible to make a distinction between the sufficiently triturated material which is then discharged through the output and the insufficiently triturated material which is not discharged and thus continues to be processed.

Preferably the triturated pieces are subjected to the action of a knife blade forming part of the counter-element and organized to disintegrate the reinforcement. The knife blade increases the disintegration of the reinforcement.

The recycling of a bituminous membrane is also made more complicated when the latter is provided on the surface with a mineral covering such as slate flakes or granules. This is because these flakes or these granules are insufficiently ground in the known methods and thus remain in the form of large particles in the ground material. The recycled material thus cannot be used as a quality raw material. Moreover, the presence of these large particles in the ground material will in its turn lead to premature wear of the rotor. In order to solve this problem, the unit according to the invention is characterized in that the counter-element comprises a knife blade organized to pulverize the mineral covering against the external wall of the rotor, which knife blade is mounted downstream of the chamber. This also makes it possible to recycle this type of membrane. The mineral covering is converted into powder by the action of the knife and thus mixes suitably with the recycled bituminous mass.

A first preferential embodiment of a unit according to the invention includes an external wall of the rotor that has a grooved profile. The presence of grooves makes it possible to drive the recyclate and guide it towards the trituration chamber thus improving the efficiency of the unit.

Preferably the counter-element and/or the stator are treated with a wear-resistant substance, in particular tungsten carbide. This makes the material of which the stator and the cylindrical body are manufactured more resistant to abrasion and protects them better against the impact of the mineral covering.

A second preferential embodiment of a recycling unit according to the invention includes downstream of the trituration chamber, a deflector disposed in an output opening of the recycling unit, said deflector being disposed along at least part of the external wall of the rotor. The presence of the deflector makes it possible to keep the recycled material in contact with the rotor for longer and thus lubricate the latter with the recycled material. Moreover, the presence of the deflector downstream of the trituration chamber and the fact that this deflector makes it possible to keep material against the rotor has the additional advantage of extinguishing, in the recycled material, any sparks which might have been created during the grinding of the mineral covering.

Preferably the recycling unit comprises an input opening and an output opening, disposed along the same axis that is offset with respect to a vertical central axis of the rotor. A suction effect is thus created on the material by the actual rotation of the rotor. This allows a better passage of the material in the recycling unit.

A third preferential embodiment of a recycling unit according to the invention comprises a second rotor housed in a second stator provided with a trituration chamber, which second stator and rotor are mounted downstream of the first stator and rotor. The presence of two rotors placed in series allows the grinding to be carried out in two stages. Thus the pulverization of the flakes and granules will take place in successive granulometric phases if the size of the trituration chamber in the second stator in comparison with that in the first stator is smaller.

A fourth embodiment of a unit according to the invention includes first and second stators that have a central input and the other a lateral input, the stator having the central input has an output situated at one end of the rotor, with each of the rotors there is associated one of said scrapers, the scraper associated with the rotor situated in the stator having its output at the end of the rotor is disposed so that the scraping is carried out at said end, and the scraper associated with the rotor whose stator has a lateral input is disposed at the center of the rotor with which it is associated. The capacity of the two rotors and the two stators is thus used to the maximum.

Preferably at least one of the scrapers is mounted on a pivot organized to make the scraper pivot between a first position where the scraper scrapes along the rotor, a second position where the scraper closes off.

Preferably the recycling unit comprises an input opening and an output opening, disposed along the same axis that is offset with respect to a vertical central axis of the rotor. A suction effect is thus created on the material by the actual rotation of the rotor. This allows a better passage of the material in the recycling unit.

A fifth preferential embodiment of a recycling unit according to the invention comprises a second rotor housed in a second stator provided with a trituration chamber, which second stator and rotor are mounted downstream of the first stator and rotor. The presence of two rotors placed in series allows the grinding to be carried out in two stages. Thus the pulverization of the flakes and granules will take place in successive granulometric phases if the size of the trituration chamber in the second stator in comparison with that in the first stator is smaller.

A sixth embodiment of a unit according to the invention includes first and second stators that have a central input and the other a lateral input, the stator having the central input has an output situated at one end of the rotor, with each of the rotors there is associated one of said scrapers, the scraper associated with the rotor situated in the stator having its output at the end of the rotor is disposed so that the scraping is carried out at said end, and the scraper associated with the rotor whose stator has a lateral input is disposed at the center of the rotor with which it is associated. The capacity of the two rotors and the two stators is thus used to the maximum.

Preferably at least one of the scrapers is mounted on a pivot organized to make the scraper pivot between a first position where the scraper scrapes along the rotor, a second position where the scraper closes off an output of the unit directing the flow to a lateral output, and a third position where the scraper completely frees the opening so as to allow discharge by centrifugal force or cleaning of the output. The fact of being able to close off the output makes it possible to keep the material in the unit for longer and thus increase the trituration of the material. This therefore makes it possible to use the same unit for a large number of types of membrane to be recycled.

To that end, a recycling method according to the invention utilizes a shape and/or volume of the chamber that can be modified according to the nature or size of the pieces of membrane to be recycled by positioning a counter-element in which there is arranged a recess that forms the chamber, which counter-element is mounted on the first stator which is substantially cylindrical, the pieces being subjected to a trituration in the chamber in order to obtain melting of the bituminous binder contained in the pieces.

BRIEF DESCRIPTION OF THE DRAWING

The invention will now be described in more detail with the help of the drawings including example embodiments of a recycling unit according to the invention. In the drawings:

FIG. 1 shows an overall view of a recycling unit according to the invention;

Figure 2A:
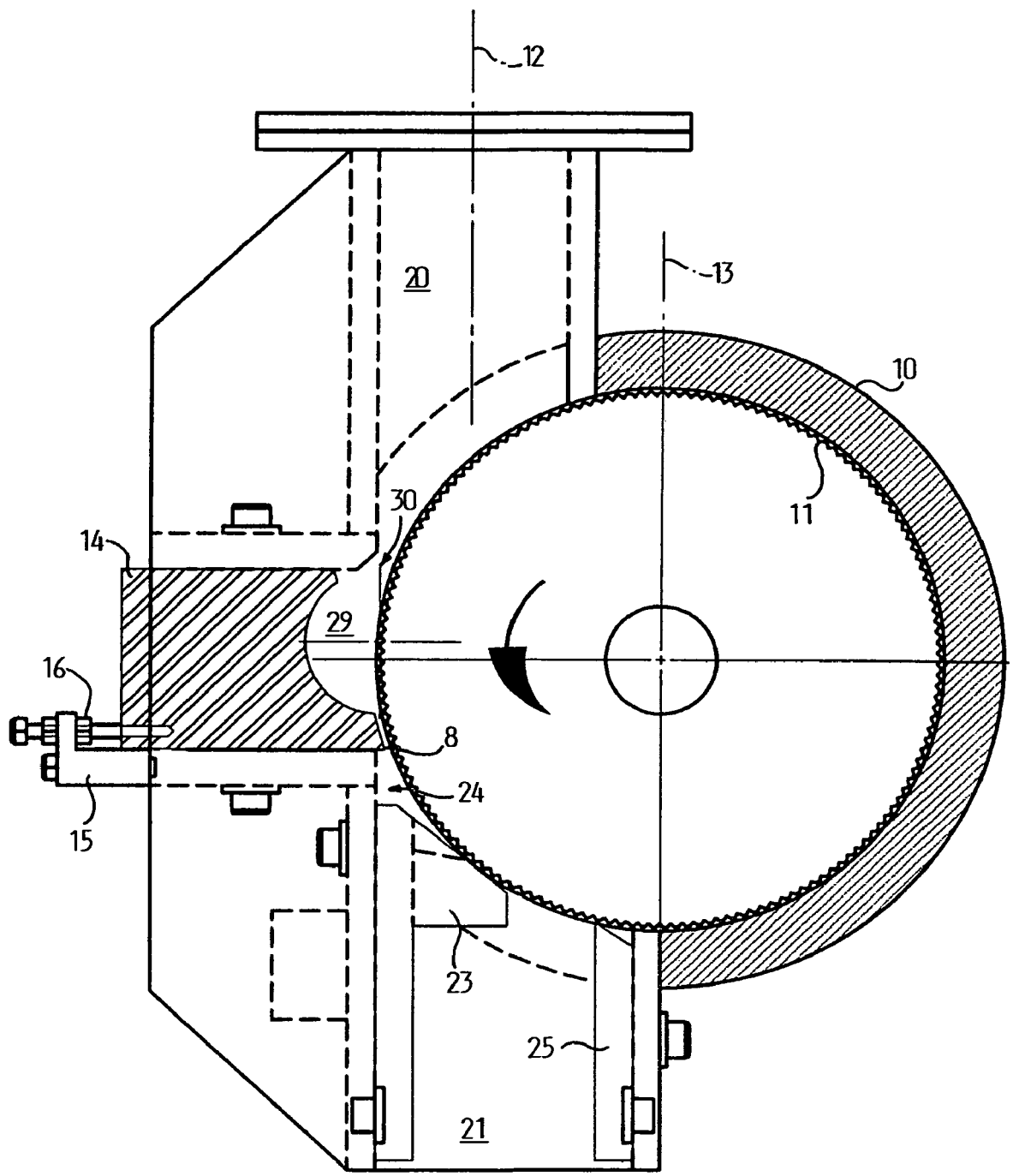
FIGS. 2a) and 2b) show a sectional view through the stator and the rotor of a first example embodiment of a recycling unit provided with a trituration chamber.

In the drawings, the same reference has been assigned to the same element or an analogous element.

DETAILED DESCRIPTION

In the example embodiment illustrated in FIG. 1, the recycling unit 1, according to the invention, comprises a feed hopper 3 connected to the input of a first member 2 provided with a rotor housed in a stator. A motor 7 drives the rotor rotationally. The speed of rotation is for example 100 to 3000 rpm. The output of the first member opens out above a tank 4 in which the viscous substance produced by the first member is recovered.

To carry out the recycling of the membrane, the latter is first reduced to pieces, for example by cutting up, which are introduced into another feed hopper 5. The prior cutting up of the membrane fragments and pieces depends on the one hand on the size of the membrane fragments and on the other hand on the profile of the rotor at the level of the input of the member. A feed screw having a large and deep screw thread will be better able to process large pieces than a screw with a small thread of reduced depth.

Membranes are generally provided with a reinforcement, for example constituted by at least one surfacing mat, a polyester non-woven fabric or a composite grid. More particularly, the membrane can also be provided on the surface with a mineral covering, for example formed by flakes or granules. A transport element 6 transports the pieces from the other hopper 5 to the hopper 3. The pieces are introduced either continuously or in a sequenced manner according to the throughput of the recycling unit.

From the hopper 3, the pieces are transported to the rotor in order to be processed there. This processing also comprises the tearing of the reinforcement still present in the pieces. The wall of the stator preferably comprises a heating body in which there circulates a heating liquid, for example oil, making it possible to heat the recycling member and therefore the membrane pieces introduced into the member.

A gap of predetermined size is left between the internal wall of the stator and the external casing of the rotor. This gap is preferably between 0.1 and 5 mm. After processing by the rotor, the processed material, which then forms a pasty substance, comes out of the member in order to fall into the hopper 4 of the recycling unit.

Figure 2B:
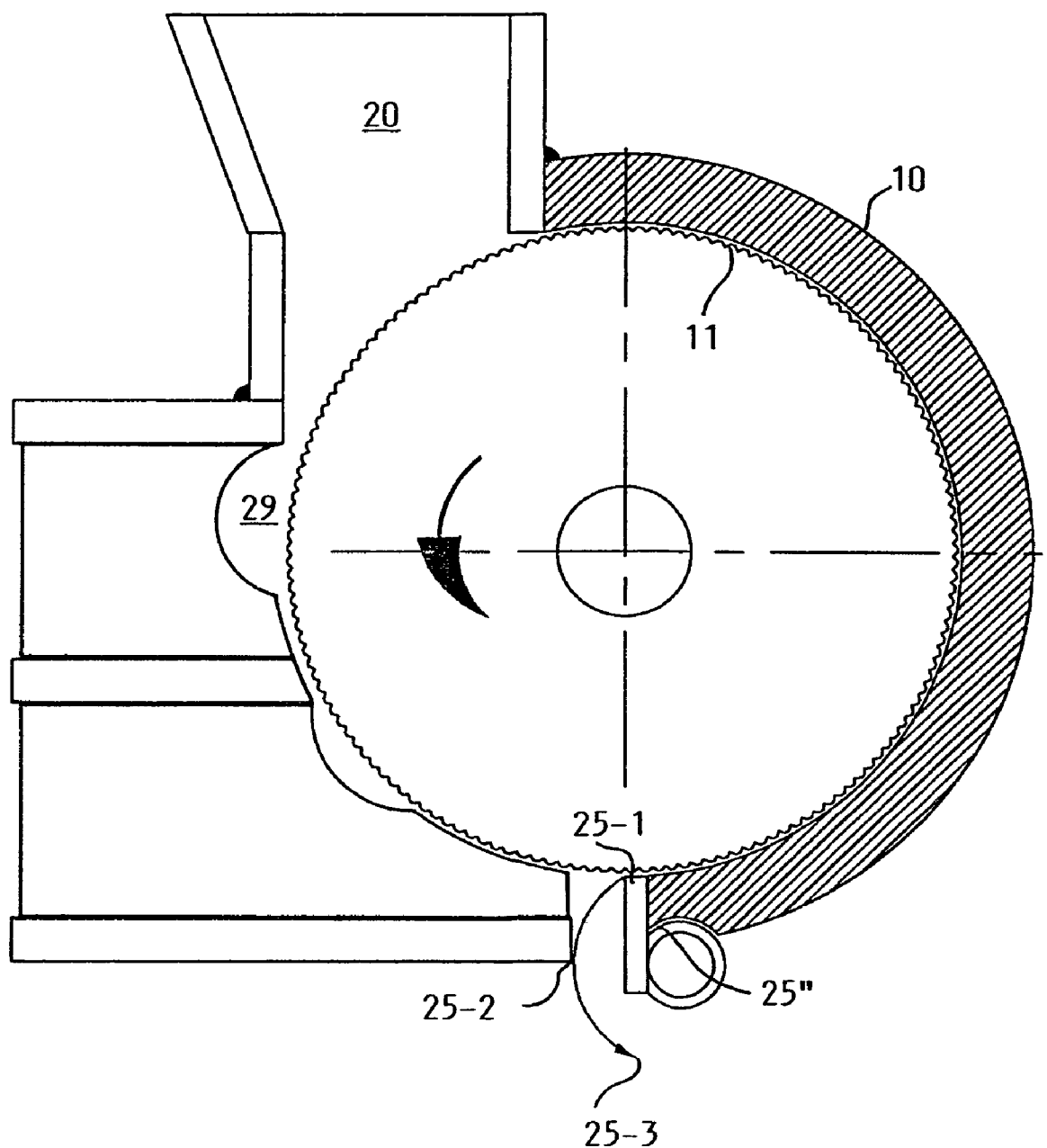

In the example embodiment illustrated in FIG. 2a, the recycling unit comprises a first stator 10, in which a first rotor 11 is housed. The stator has a substantially cylindrical geometry that facilitates its manufacture. The input 20 and the output 21 are situated along the same vertical axis 12 which is offset with respect to the central vertical axis 13 of the rotor. This offset has the effect of creating, by the rotation of the rotor 11, a suction effect on the pieces introduced into the input 20. It is also possible to offset the input and the output with respect to one another as illustrated in FIG. 2b.

The embodiment of a recycling unit according to the invention and illustrated in FIG. 2a is provided with a trituration chamber 29. In the example illustrated, the trituration chamber is delimited on the one hand by a recess produced in a counter-element 14 mounted on the stator and on the other hand by an external wall of the first rotor. The trituration chamber 29 allows the mass introduced into the input opening to accumulate there temporarily. Since the chamber is delimited by the external wall of the rotor, the bituminous mass, which is situated in this chamber, will be driven rotationally by the rotation of the rotor and thus swirl around in the chamber 29. Thus, the introduced cold material will heat up more quickly and will be triturated more easily. This is because the centrifugal force imposed on the mass by the rotor will make it heat up more quickly. The mass thus present in the chamber will be mixed and/or ground in order to melt it. When the unit is equipped with heating means, the latter contribute towards heating said mass. The passage 30 that extends between the input opening 20 and the trituration chamber is chosen to be sufficiently wide so as to facilitate access to the trituration chamber.

The trituration chamber can be mounted rigidly in the stator; however it is preferably mounted in an adjustable and removable manner in the stator. To that end, the trituration chamber is mounted on a first support 15 provided with an adjustment means 16, for example formed by a screw and a bolt. The adjustment means allow not only mounting and removal of the chamber, but also make it possible to vary of the size of the chamber by moving it nearer or further away with respect to the external wall of the rotor. Moreover, a set of trituration chambers, each having a different size, can be provided. Thus it is possible to modify the volume or configuration of the chamber by mounting a different-sized chamber. The different sizes of the chamber make it possible to use the same unit for different types of bituminous membrane and thus adapt the trituration to the membrane type. Thus for example, for large-sized pieces, the size of the chamber will be greater than that used for smaller-sized pieces. When the pieces come from a membrane having several layers of fibers and provided with glass fibers, a large-sized chamber will preferably be used in order to have sufficient volume and to allow a longer mixing time. The shape and size of the trituration chamber make it possible to capture the mass to be recycled with a view to melting it by friction.

Since the membrane pieces are triturated in the chamber 29, shearing of the reinforcement present in the membrane pieces is obtained. Moreover, the trituration makes it possible, so to speak, to lubricate both the rotor and the recess in the counter-element 14 and thus reduce the wear of the unit.

One end 8 of the counter-element 14, situated downstream of the chamber 29, forms the tip of the blade of a knife which is used to shear the pieces triturated in the chamber more and to disintegrate the reinforcement present in the pieces. The blade of the knife is also used to shear and pulverize the mineral covering provided on the surface of the bituminous membrane.

A deflector 23 is mounted downstream of the trituration chamber. The deflector is mounted on the stator and disposed in the output opening 21, along part of the external wall of the rotor 11. The deflector is preferably trapezoidal in shape and delimits a first cavity 24, formed between the lower part of the support 15, the upper part of the deflector 24, the stator and the rotor. Thus, the bituminous mass that has passed through the chamber can accumulate temporarily in this first cavity which thus forms a buffer. From this buffer, the melted mass will then be conveyed by the deflector along the rotor and will lubricate the latter.

A scraper 25 is mounted downstream of the deflector also in the output opening 21. The scraper and the deflector are disposed so as to be at a distance from each other on opposite sides of the output opening. Thus, a corridor is created between the deflector and the scraper through which the processed material can reach the output opening. The scraper is mounted on a support 26, using adjustment means 27. The scraper is used to scrape the external wall of the rotor so as to scrape the material which accumulates on this wall. Preferably the scraper extends over at least part of the length of the rotor.

FIG. 2b illustrates an embodiment of the unit according to the invention where the scraper is mounted on a pivot 25" organized to make the scraper pivot between a first position (25-1) where the scraper scrapes along the rotor, a second position (25-2) where the scraper closes off the output of the unit and a third position (25-3) where the scraper completely frees the opening. When the scraper is in the second position, the mass can either continue to circulate in the unit or, when the unit is equipped with a lateral output, be directed to this lateral output. When the scraper obstructs the output of the unit, the material, which continues to circulate in the unit, will heat up more through the friction of this material with the stator and the rotor. When the scraper is in the third position, the opening is free and the mass is discharged by centrifugal force. This last position also makes it possible to clean the output since it is wide open.

Figure 3:
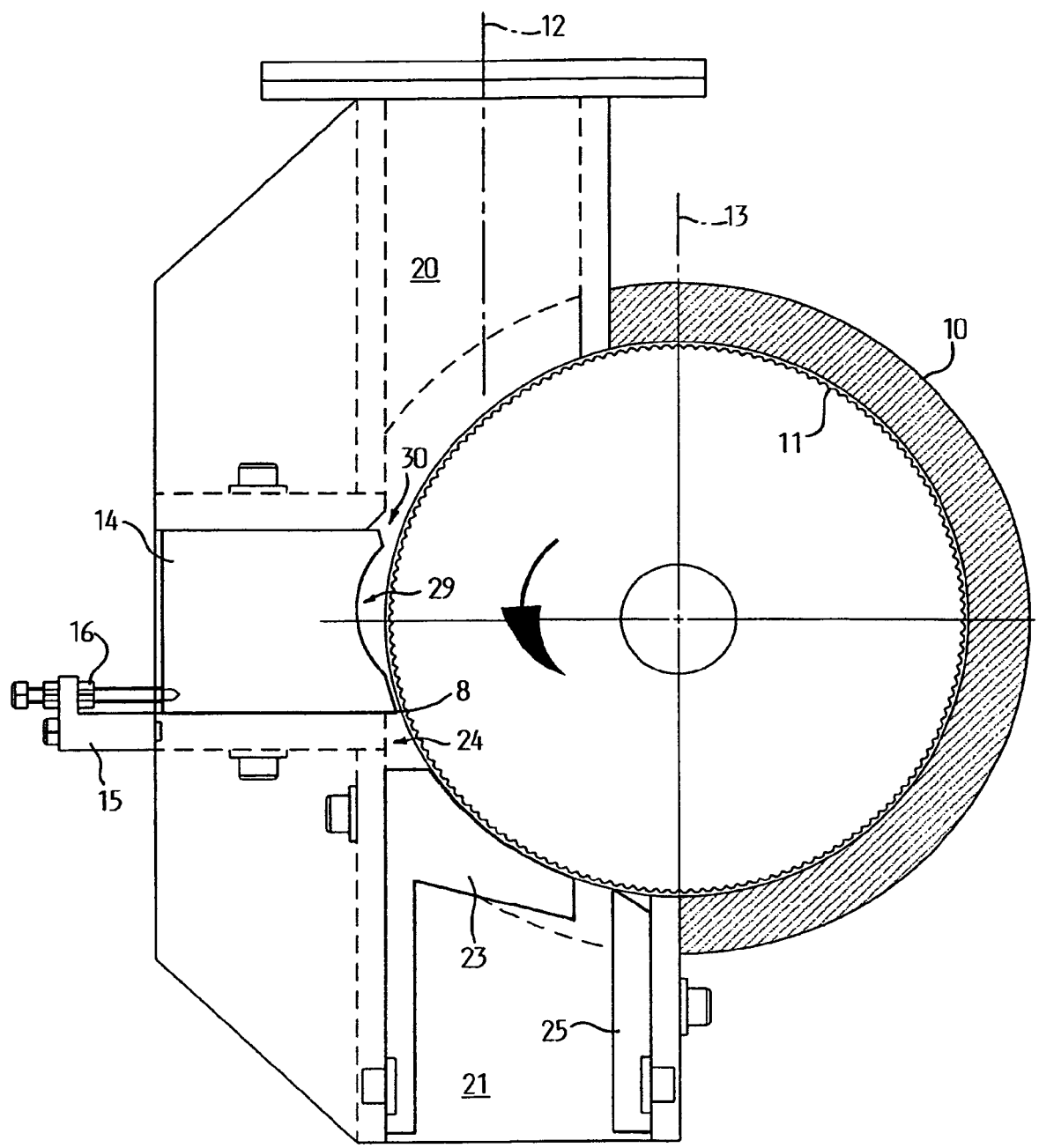
FIGS. 3 and 4 show a sectional view, through the stator and the rotor, of other example embodiments of a recycling unit provided with a trituration chamber.
Figure 4:
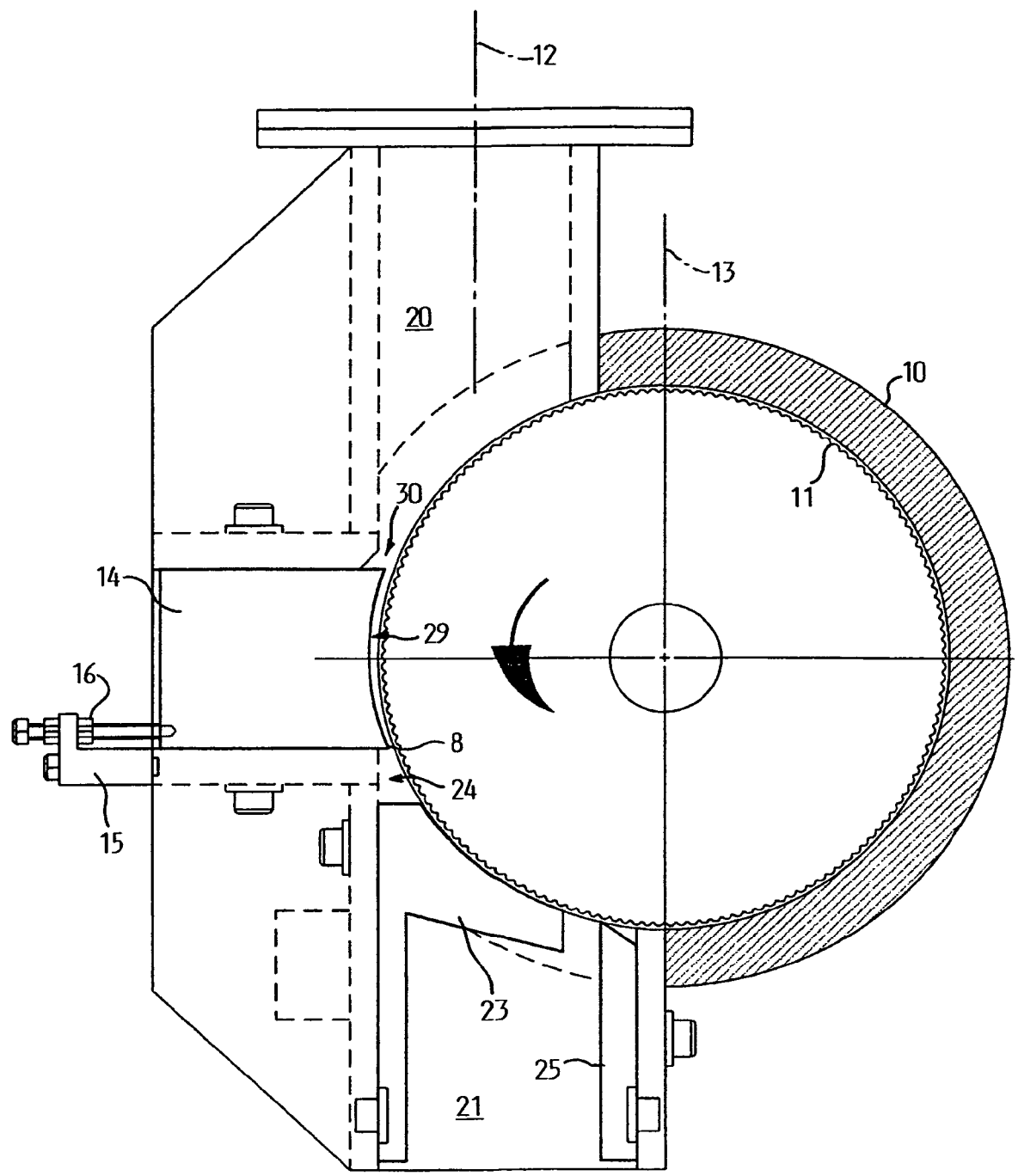

FIGS. 3 and 4 show other embodiments of the trituration chamber 29 and of the deflector 23. Thus, in the example illustrated in FIG. 3, the chamber has a radius of curvature shorter than that of the chamber illustrated in FIG. 2, while in the example illustrated in FIG. 4 the chamber is smaller in size compared with that illustrated in FIG. 2. As for the deflector, this is larger in size.

It is also possible to mount, in the same stator, several chambers downstream of one another. Each of the chambers is preferably mounted in a removable manner.

Figure 5:
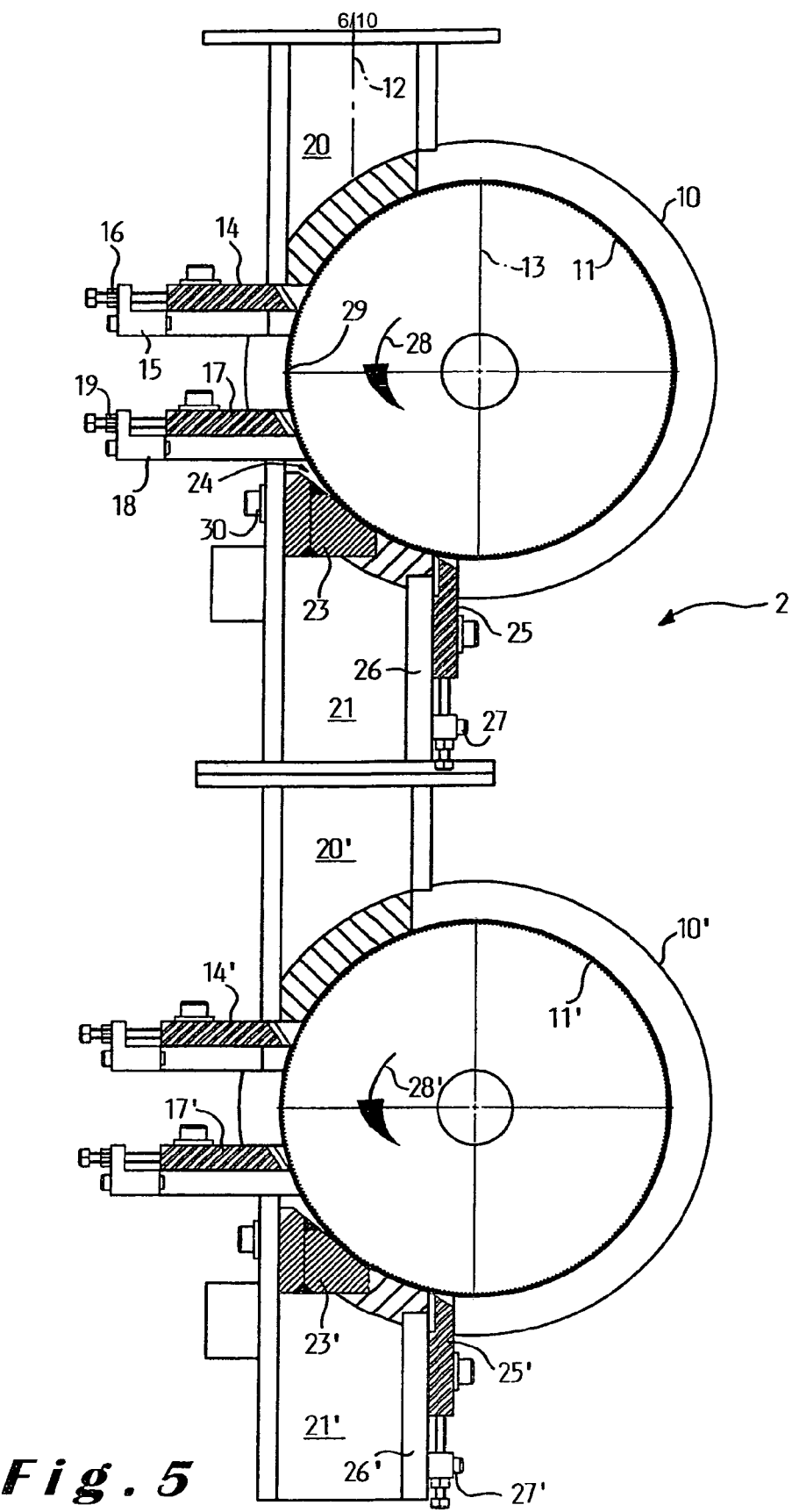
FIG. 5 shows a sectional view through the stator and the rotor of yet another example embodiment of a recycling unit having two rotors and two stators.

FIG. 5 illustrates another embodiment of a unit according to the invention where the chamber is smaller in size and ends at the tip of the blade of a knife 17 which also delimits the chamber. Moreover, in the example embodiment illustrated in FIG. 5, the recycling unit comprises in addition to the first stator 10 and the first rotor 11 also a second stator 10' and a second rotor 11'. The first and second stators and rotors preferably have a substantially identical construction and are placed in series so that the second is downstream of the first. Thus an output 21 of the first opens into an input 20' of the second. To facilitate understanding, the identical elements of the second member have been indicated using the same reference as that used for the first but provided with a prime.

Each unit comprises a first 14, 14' and a second 17, 17' knife blade, which are mounted on a first 15, 15' and a second 18, 18' support. The latter are fixed on the stator. The knife blades are mounted in an adjustable manner by virtue of the adjustment means 16, 19. The adjustment means allow not only mounting and removal of the knife blades, but also make it possible to vary the distance between the tip of each knife blade and the rotor. Thus, for example, the distance between the tip of the knives 14, 17, 14' and 18' can be 1.5 mm, 1 mm, 0.5 mm and 0.2 mm respectively. This variation in distance makes it possible to reduce the size of the fibers and the mineral covering more and more. It is self-evident that the embodiment with two rotors and two stators, each provided with two knife blades, is given solely by way of example and that other embodiments with only one rotor and one stator provided with a single blade or with more rotors and stators each provided with one or more knife blades are also possible.

To recycle the bituminous membrane pieces, they are introduced into the input opening 20 of the first member. If necessary, the size of the chamber is adjusted, either by moving the chamber, or by mounting a chamber appropriate for the type of membrane to be processed. The rotation, indicated by the arrow 28, of the rotor and the offset of the opening 20 with respect to the central axis 13 cause the suction towards the rotor of the introduced material. This will at first accumulate in the opening on the external wall of the rotor which passes through the opening during its rotation. The mass can heat up more quickly if the stator and rotor are heated using the heating body. The heated mass will then, by the rotation of the rotor, be driven towards the trituration chamber 29 and if applicable towards the first knife blade 17 which will destructure the structure of the reinforcement and if applicable pulverize the flakes or granules of the covering according to the size of the chamber and/or the distance that separates the tip of the knife from the external wall of the rotor. Thus, a first grinding and cutting up of the membrane pieces is carried out. After having passed the first knife blade, the mass has risen in temperature under the effect of friction and the heat present in the stator and rotor. Thus the mass will liquefy more before reaching, if applicable, the second knife blade. As the latter is nearer the external wall of the rotor, cutting up of the fibers will take place more and the mineral covering will be broken up more.

After having passed the knife blades, the hot mass will temporarily accumulate in the cavity 24 in order to heat up more and reach its melting point in order to be next conveyed along the external wall of the rotor with the help of the deflector 23. The hot mass thus lubricates the rotor. Next, the mass reaches the corridor between the deflector 23 and the scraper 25 in order to fall into the output opening 21 under the effect of gravity. The scraper 25 takes care of scraping the external wall of the rotor, so as to prevent the mass, which is sticky because of the presence of hot bitumen, accumulating on the rotor and thus preventing its rotation. The distance between the scraper and the external wall of the rotor is chosen so that a little bituminous mass remains on the rotor and lubricates its movement. In the example embodiment according to FIG. 5, the mass that has reached the output opening 21 then falls into the input opening 20' of the second member where a similar processing will be applied to it. As however in the second member the knife blades are closer to the rotor compared with the first, the fibers and covering are ground more so that the mass that leaves the output opening 21' is formed by a substantially homogeneous pasty substance.

FIG. 5, as described previously, illustrates a unit where two stators and rotors are mounted in series, each being equipped with knives. However, it is also possible to mount two stators and rotors in series where each is equipped with a trituration chamber as illustrated in FIGS. 2 to 4.

Figure 6:
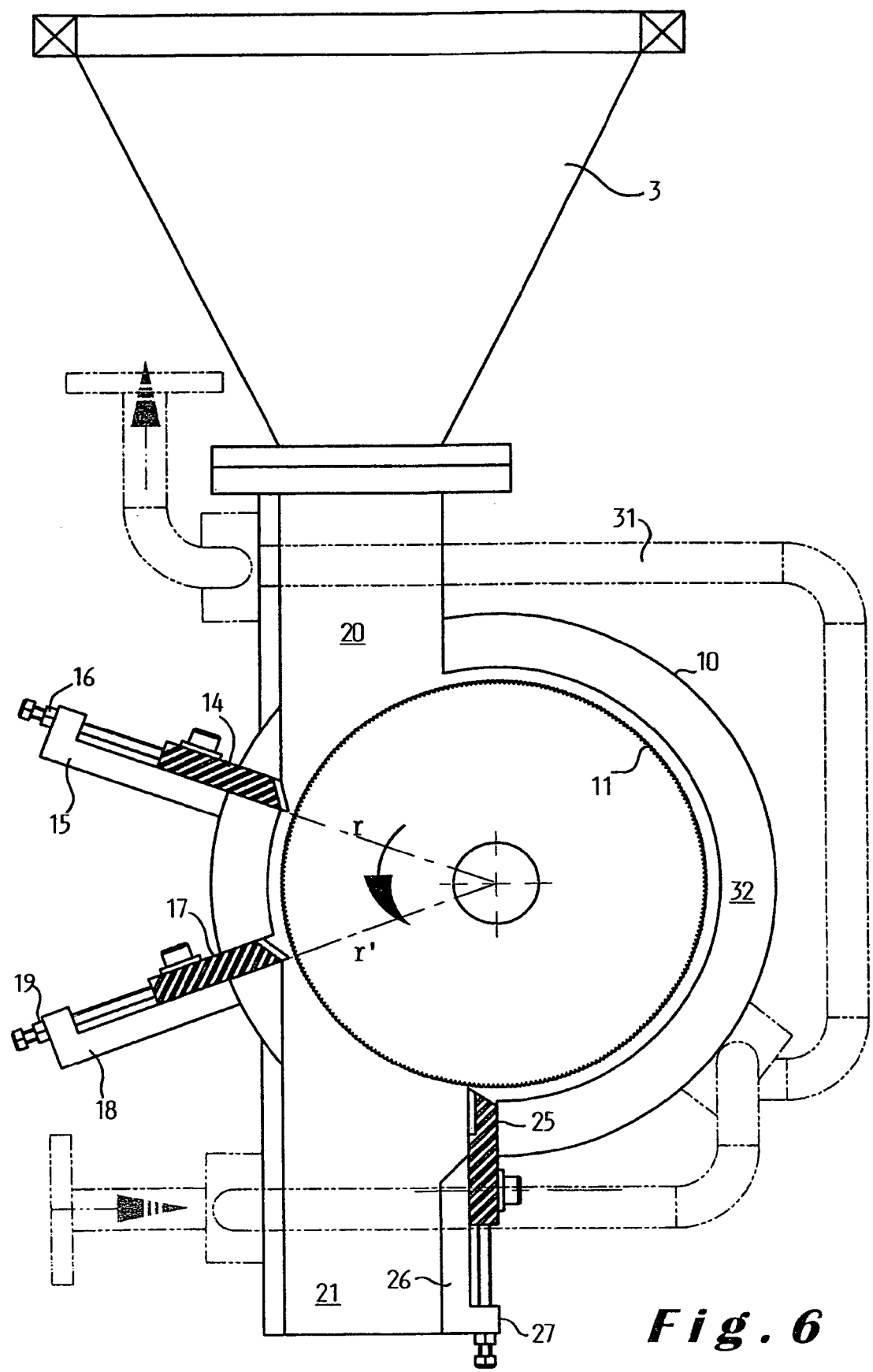
FIG. 6 shows a sectional view through the stator and the rotor of another embodiment of a recycling unit according to the invention.

FIG. 6 shows another embodiment of a recycling unit according to the invention. This figure also shows the heating body 31 that makes it possible to heat the unit. This heating body comprises for example pipes that convey a heated liquid into an external casing 32 of the stator.

The first blade 14 of the first knife is placed on the peripheral edge of the stator and points towards the external wall of the rotor. The blade is shaped and the tip of the first blade 14 is directed along a radius r of the rotor and forms an acute angle with the tangent of the rotor. The first blade is mounted in a removable manner on a support 15. The support 15 is placed on the stator so as to be accessible from the outside, which facilitates the mounting and removal of the blade. It is sufficient in fact to slide the blade on the guide in order to mount or remove it. Moreover, the sliding of the blade on the adjustment means 16 makes it possible to adjust the position of the blade and therefore regulate its spacing with respect to the rotor.

At least one second blade 17 of a second knife is placed on the peripheral edge of the stator.

Preferably, the knife blades and/or the cylindrical stator are treated with a wear-resistant substance, like for example tungsten carbide, which makes them better resistant to the impact caused by the flakes or granules that form the mineral covering of the bituminous membrane to be ground. Moreover, the knife blades are preferably mounted so that the spacing of the blades with respect to the external wall of the rotor can be regulated. This is for example carried out by virtue of notched grooves or sliding channels.

Figure 7:
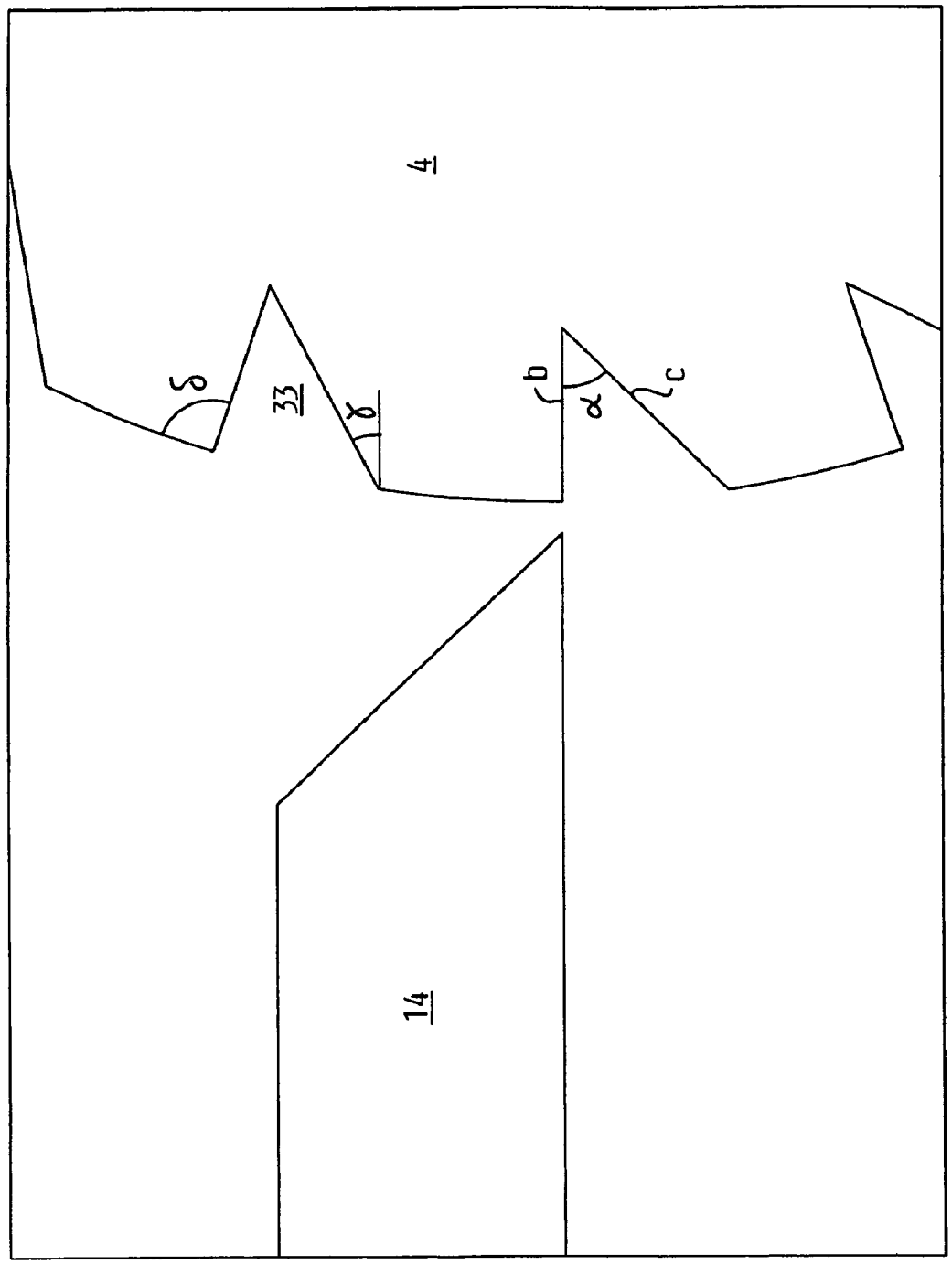
FIG. 7 illustrates in detail part of the rotor and of the knife.

Preferably, the wall of the rotor 11 is provided with a grooved profile as illustrated in FIG. 7. This profile is formed by triangular-shaped recesses 33. The triangles are formed so that the side c forms an acute angle $\gamma$ with the tangent to the rotor. The side c furthermore has a length greater than the side b. Moreover, the side b preferably forms an angle $\delta=90°$ with the tangent to the rotor. Thus, when each side b is situated at the level of a blade, this side b is situated in line with the tip of the blade thus making it possible to drive the mass between the blade and the rotor. The angle $\alpha$ between the sides b and c is for example between 15° and 75° and the side b has a length $0.1 \leq b \leq 3$ while the side a has a length $0.1 \leq a \leq 4$ mm.

Figure 8:
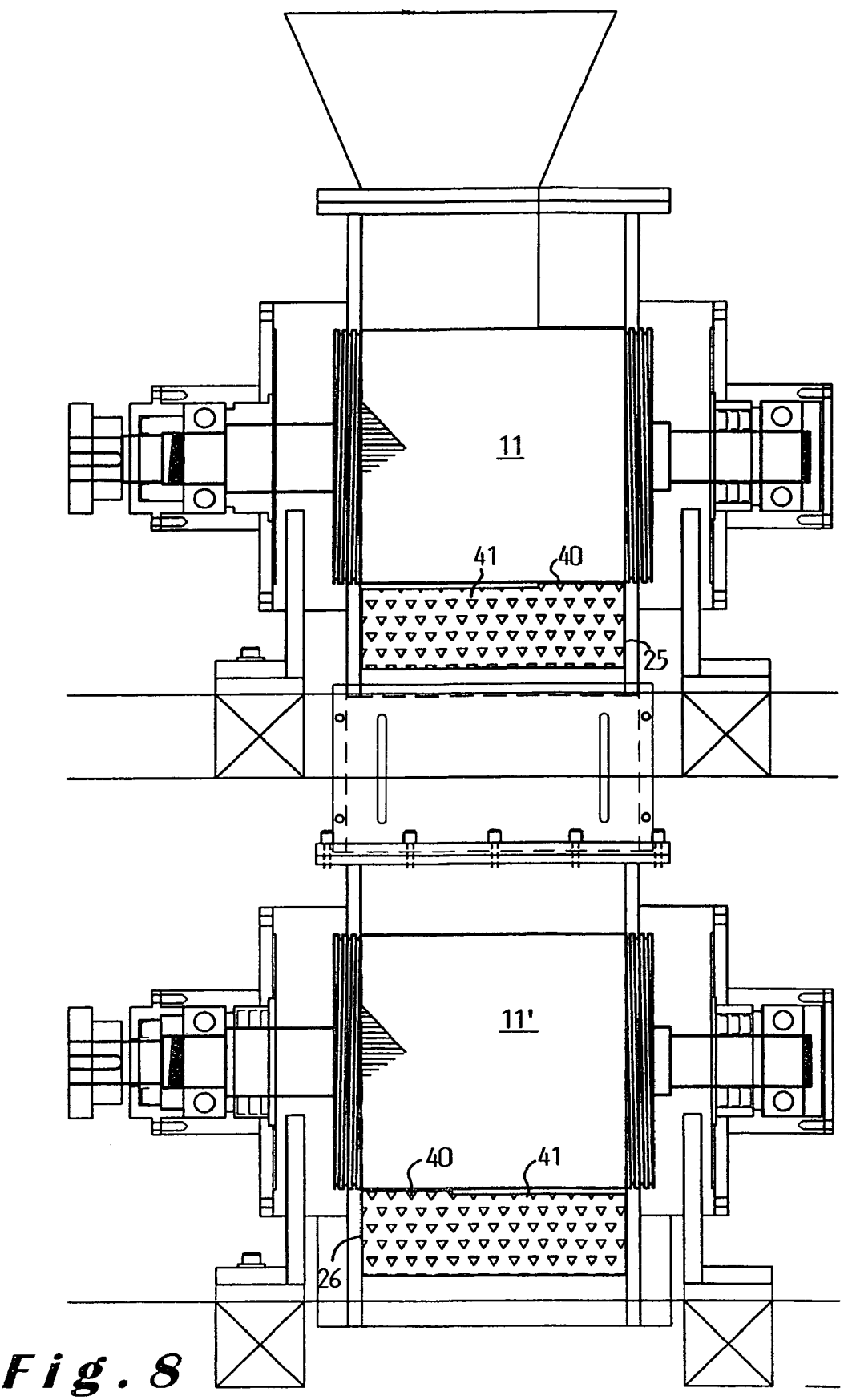
FIG. 8 illustrates a sectional view through the stator and the rotor of a recycling unit having two rotors, two stators and two scrapers.

FIG. 8 illustrates an example embodiment of a recycling unit according to the invention having two rotors and two stators mounted in series. A scraper 25 is associated with the first rotor 11, while a scraper 26 is associated with the second rotor 11'. The first and the second rotor are disposed so that the triturated pieces circulating along the second rotor circulate in the opposite direction compared with that of the first rotor. Thus, in the example of FIG. 8, the pieces to be processed are introduced on the left side of the first rotor 11 and the triturated material circulates from left to right. It then arrives at the output of the rotor 11 in order to leave the latter and reach the right-hand end of the second rotor where it will circulate from right to left. On its path through the two rotors, the triturated material thus describes a substantially S-shaped path.

The scrapers 25 and 26 have a stepped profile having a first 40 and a second 41 step. It is self-evident that the number of steps is not limited to two and can be greater. The first step 40, which is situated close to the output of each rotor, is disposed closest to the external wall of the rotor. As for the second step 41, this is a little further away from the rotor. The stepped profile makes it possible, according to the principle of an Archimedes screw, to impose several rotations on the material before leaving the stator and thus to heat it up and triturate it more. The trituration is thus less dependent on the time of a single rotation. The S-shaped path imposed on the material makes it possible to dispose the rotors in the most efficient way whilst limiting the space occupied by the unit. Preferably, the first step covers one third of the length of the scraper, whilst the second covers the remaining two thirds.

Figure 9:
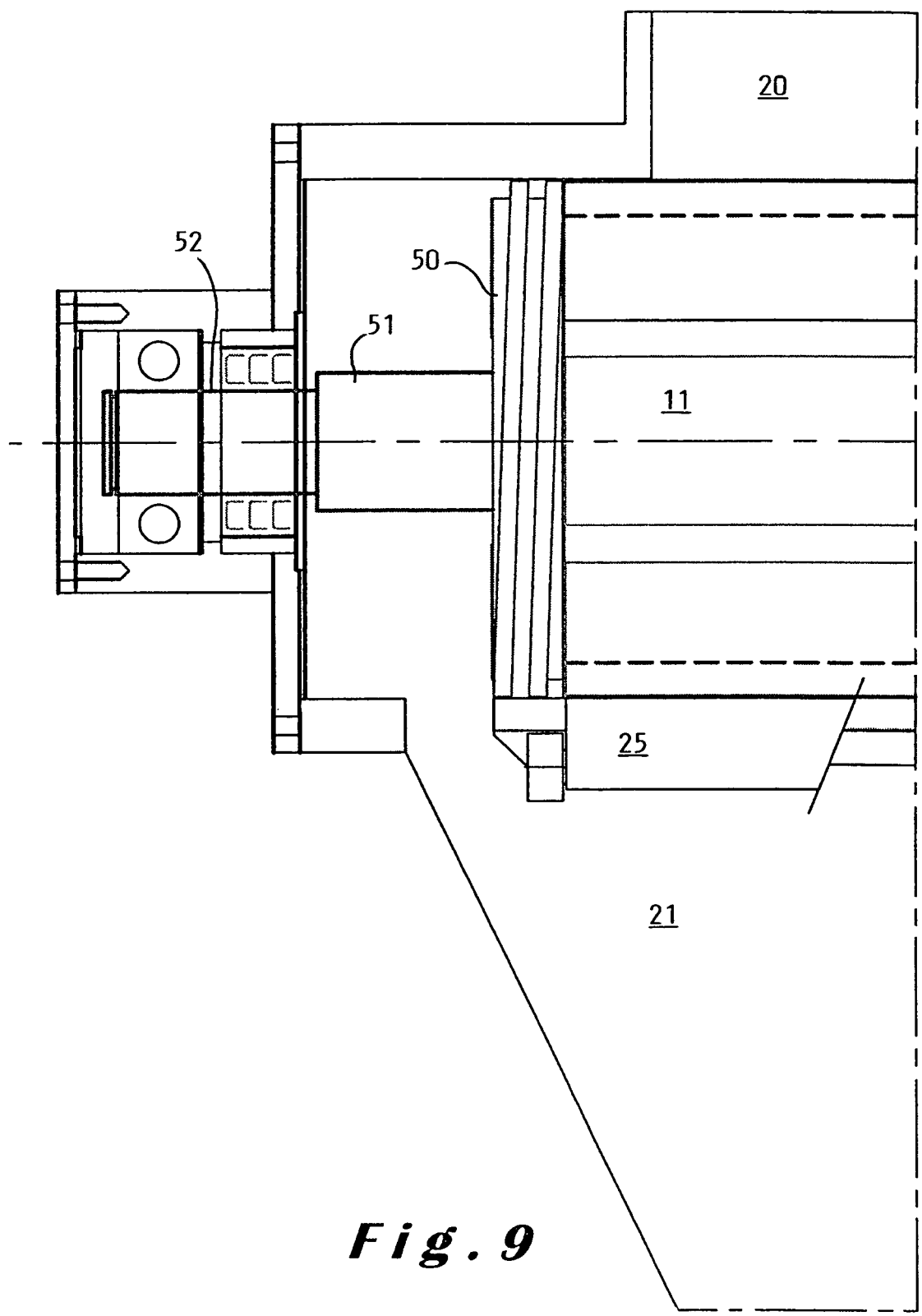
FIG. 9 illustrates a sectional view through the stator and the rotor at one end thereof.

When the unit comprises two or more rotors and stators mounted in series with one another, it can be envisaged that the input of one stator is situated at the center and that of another stator is situated at a lateral side. Let the case be taken where a first stator has a central input and a second, mounted downstream of the first, has a lateral input. The first stator will then have an output situated at one end of the rotor so that the output of the first stator is aligned with the input of the second stator. FIG. 9 illustrates an example of a stator having a central input 20 and a lateral output 21.

Each rotor comprises a scraper 25 and the scraper associated with the first rotor that has an output at its end is disposed so that the scraping is carried out at this end of the rotor. The scraper associated with the second stator is disposed at the center of the rotor with which it is associated. In this way the scraping is carried out exactly at the place where the output is situated.

This disposition of the stators allows a better distribution of the masses to be processed and therefore makes it possible to increase the processing capacity without having to increase the volume of the stators.

FIG. 9 also illustrates a particular implementation of the profile of the rotor 11. The end 50 of the rotor 11 is equipped with an Archimedes screw oriented in the reverse direction to that along which the material to be recycled circulates. This configuration makes it possible to protect the shaft 51 and the antifriction bearings or bearings 52 of the rotor against bitumen deposits. This is because the orientation in the reverse direction will return the material to be recycled towards the rest of the rotor thus preventing it reaching the shaft 51 and the antifriction bearings or bearings 52. Preferably, an Archimedes screw oriented in the reverse direction is placed at each end of the rotor.

When several rotors are mounted in series, the Archimedes screw of the last rotor can be implemented in such a way that the melted material reaches the desired degree of viscosity. Thus it can cross the Archimedes screw and flow to the most off-center point of the last rotor. This makes it possible to close the rotor/stator space more and obtain a recycled material having a high fluidity.

The description that has just been given was restricted to the recycling of bituminous membranes. However, the method and unit described are not restricted to this recycling and can be used in other applications requiring for example the grinding of fibrous structures or hard materials covered in a material that becomes pasty when heated.

The invention claimed is:

1. A recycling unit for recycling a bituminous membrane provided with at least one reinforcement, which unit comprises a first rotor housed in a first stator, provided with a chamber delimited by an external wall of the first rotor, wherein the chamber is a trituration chamber formed by a recess arranged in a counter-element mounted on the stator which is substantially cylindrical, which trituration chamber comprises an adjustment means organized to adjust the volume and/or shape of the chamber and wherein at least one scraper organized to scrape the external wall of the rotor is mounted downstream of the trituration chamber, which scraper extends over at least part of the length of the first rotor and has a stepped profile having at least a first and a second step, the first step, which is situated close to an output of the recycling unit, being disposed closest to the external wall of the first rotor.

2. The recycling unit as claimed in claim 1 wherein the external wall of the rotor has a grooved profile.

3. The recycling unit as claimed in claim 1, for recycling a bituminous membrane provided on the surface with a mineral covering and wherein the counter-element comprises a knife blade organized to pulverize the mineral covering against the external wall of the rotor, which knife blade is mounted downstream of the chamber.

4. The recycling unit as claimed in claim 3, wherein the external wall of the rotor has a grooved profile.

5. The recycling unit as claimed in claim 4, wherein the counter-element and/or the stator are treated with a wear-resistant substance.

6. The recycling unit as claimed in claim 3, wherein the knife blade is mounted so as to make it possible to adjust its distance with respect to the external wall of the rotor.

7. The recycling unit as claimed in claim 5, wherein the wear-resistant substance is tungsten carbide.

8. The recycling unit as claimed in claim 1 wherein, downstream of the trituration chamber, a deflector is disposed in an output opening of the recycling unit, said deflector being disposed along part of the external wall of the rotor.

9. The recycling unit as claimed in claim 1, wherein said recycling unit comprises an input opening and an output opening disposed along the same axis that is offset with respect to a vertical central axis of the rotor.

10. The recycling unit as claimed in claim 1, wherein said recycling unit comprises a second rotor housed in a second stator provided with an interchangeable trituration chamber, which second stator and rotor are mounted downstream of the first stator and rotor.

11. The recycling unit as claimed in claim 10, wherein one of the first and second stators has a central input and the other a lateral input, the stator having the central input has an output situated at one end of the rotor, with each of the rotors there is associated one of said scrapers, the scraper associated with the rotor situated in the stator having its output at the end of the rotor is disposed so that the scraping is carried out at said end, and the scraper associated with the rotor whose stator has a lateral input is disposed at the center of the rotor with which the scraper is associated.

12. The recycling unit as claimed in claim 1, wherein at least one of the scrapers is mounted on a pivot organized to make the scraper pivot between a first position where the scraper scrapes along the rotor, a second position where the scraper closes off an output of the unit directing the flow to a lateral output, and a third position where the scraper completely frees the opening so as to allow discharge by centrifugal force or cleaning of the output.

13. The recycling unit as claimed in claim 1, wherein at least one end of the rotor is equipped with an Archimedes screw oriented in the reverse direction to that along which the material to be recycled circulates.

14. A method for recycling a bituminous membrane by using a recycling unit, which membrane is provided with at least one reinforcement, said recycling unit being provided with a first rotor, housed in a first substantially cylindrical stator, provided with a chamber delimited by an external wall of said first rotor, said chamber having a shape and/or a volume which can be adjusted by positioning a counter-element in which there is arranged a recess that is part of said chamber, said counter-element being mounted on said first stator, said recycling unit further comprising at least one scraper having a stepped profile with at least a first and a second step and being mounted downstream of said chamber, said method comprising:

(a) reducing said bituminous membrane into pieces, having a nature or a size;
(b) introducing said pieces into said recycling unit;
(c) adjusting said shape and/or volume of said chamber by positioning said counter-element in such a manner as to be compatible with said nature or size of said pieces;
(d) conveying said pieces into said chamber and mixing and/or grinding said pieces within said chamber in order to obtain processed pieces;
(e) discharging said processed pieces from said chamber by having them flown along said external rotor wall;
(f) subjecting said processed pieces to a trituration within said chamber in order to obtain a melting of the bituminous binder contained in said processed pieces;
(g) using said stepped profile of said at least one scraper for imposing several rotations on said melting bituminous binder in order to obtain melt bitumen; and
(h) scraping said melt bitumen from said external rotor wall by using said at least one scraper.

15. A method for recycling a bituminous membrane by using a recycling unit, which membrane is provided with at least one reinforcement, said recycling unit being provided with a first rotor, housed in a first substantially cylindrical stator, provided with a chamber delimited by an external wall of said first rotor, said chamber having a shape and/or a volume which can be adjusted by positioning a counter-element in which there is arranged a recess that is part of said chamber, said counter-element being mounted on said first stator, said recycling unit further comprising at least one scraper having a stepped profile with at least a first and a second step and being mounted downstream of said chamber, said method comprising:

(a) reducing said bituminous membrane into pieces, having a nature or a size;
(b) introducing said pieces into said recycling unit;
(c) adjusting said shape and/or volume of said chamber by positioning said counter-element in such a manner as to be compatible with said nature or size of said pieces;
(d) conveying said pieces into said chamber and mixing and/or grinding said pieces within said chamber in order to obtain processed pieces;
(e) discharging said processed pieces from said chamber by having them flown along said external rotor wall; and
(f) subjecting said processed pieces to a trituration within said chamber in order to obtain a melting of the bituminous binder contained in said processed pieces.

16. The recycling method as claimed in claim 15, wherein the triturated pieces are subjected to the action of a knife blade forming part of the counter-element and organized to disintegrate the reinforcement.

17. The recycling method as claimed in claim 16, wherein the bituminous membrane is provided on the surface with a mineral covering, which is freed by a rise in temperature, and wherein the knife blade pulverizes the mineral covering.

18. The recycling method as claimed in one of claim 17, wherein, after trituration, the triturated and/or ground material is scraped from the rotor.

* * * * *